Jan. 8, 1963 M. H. SESSIONS ET AL 3,072,299
DISPENSER FOR POWDERED SOAP AND THE LIKE
Filed June 17, 1960 5 Sheets-Sheet 1
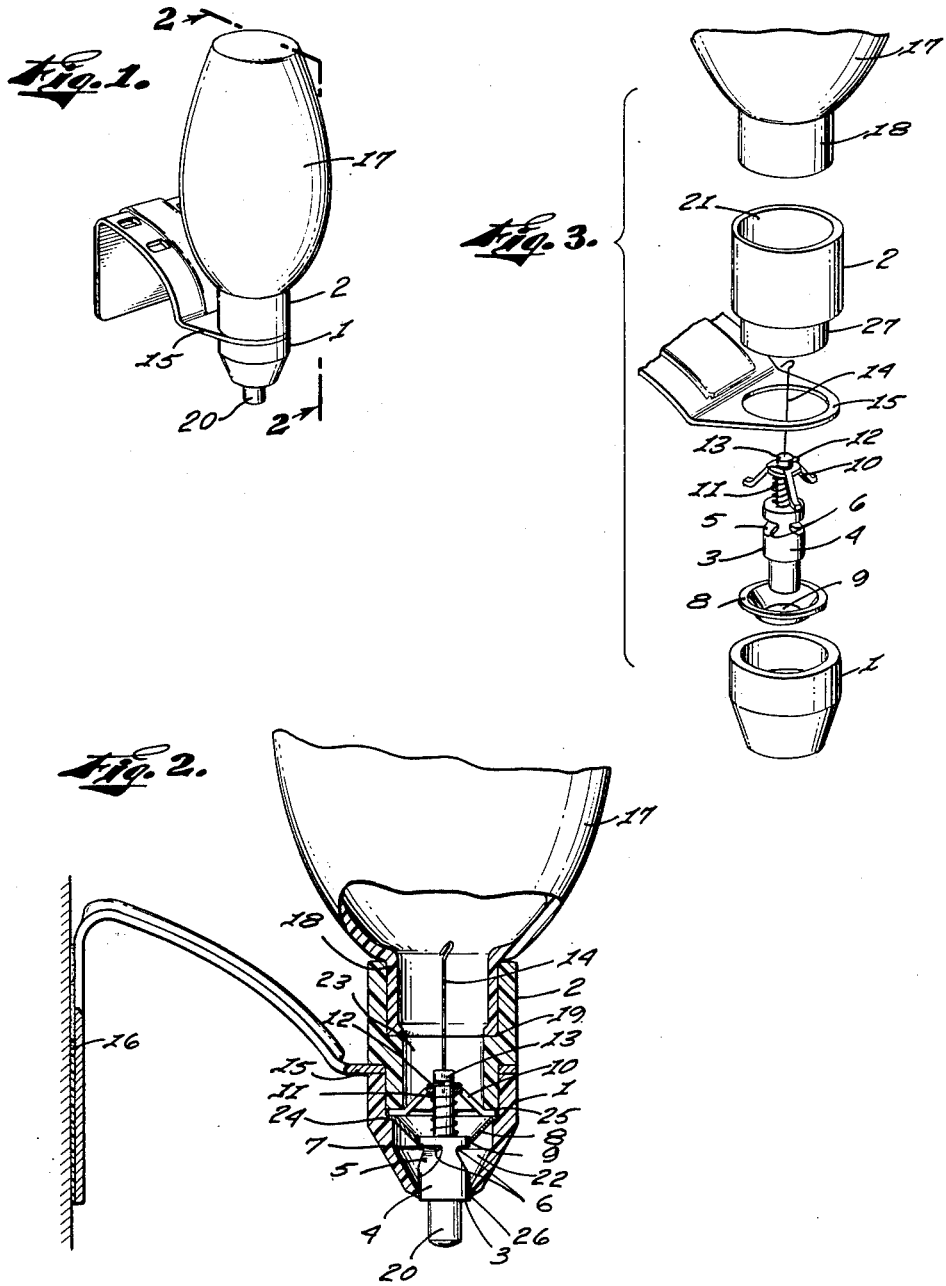
INVENTORS
MARC H. SESSIONS
ANDREW H. NEUBAUER
BY
AGENT Jan. 8, 1963 M. H. SESSIONS ET AL 3,072,299
DISPENSER FOR POWDERED SOAP AND THE LIKE
Filed June 17, 1960 5 Sheets-Sheet 2
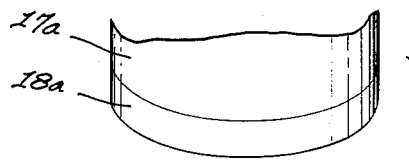
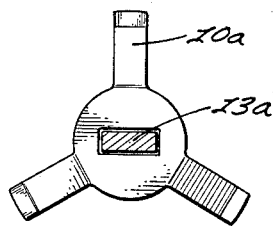
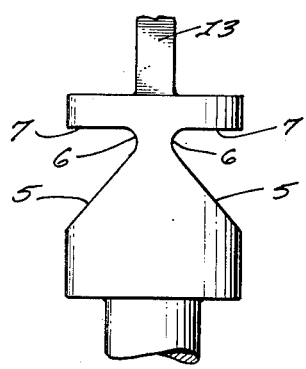
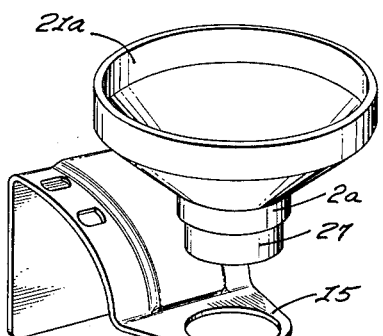
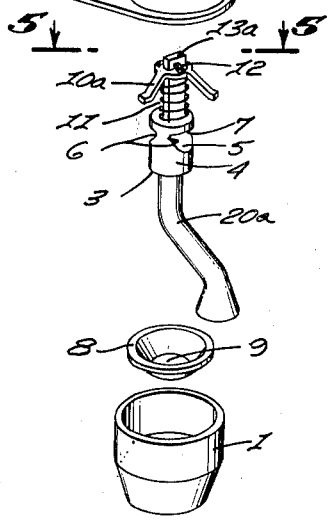
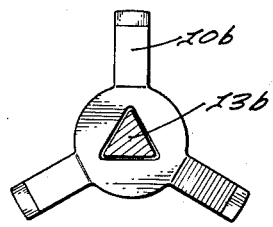
INVENTORS
MARC H. SESSIONS
ANDREW H. NEUBAUER
BY
AGENT Jan. 8, 1963 M. H. SESSIONS ET AL 3,072,299
DISPENSER FOR POWDERED SOAP AND THE LIKE
Filed June 17, 1960 5 Sheets-Sheet 3
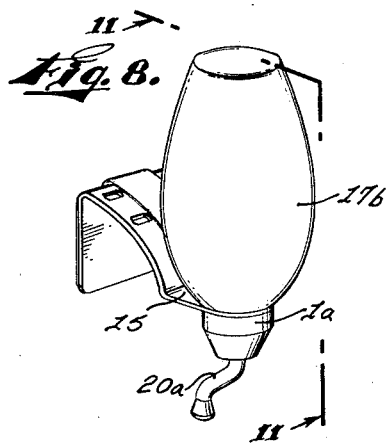
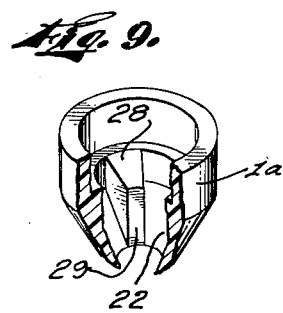
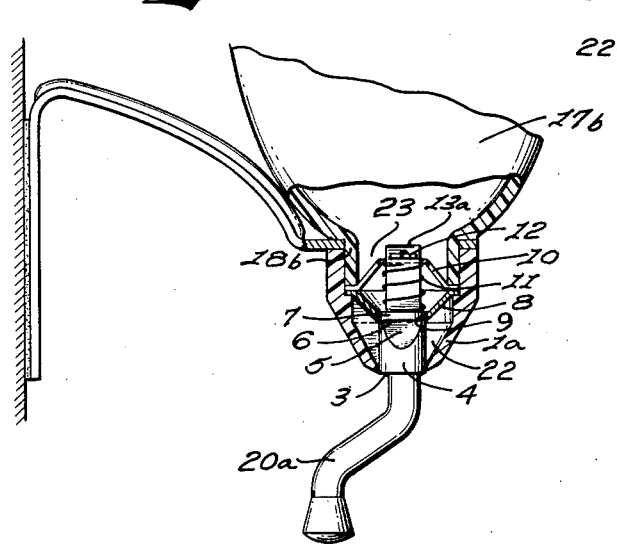
INVENTORS
MARC H. SESSIONS
ANDREW H. NEUBAUER
BY
AGENT

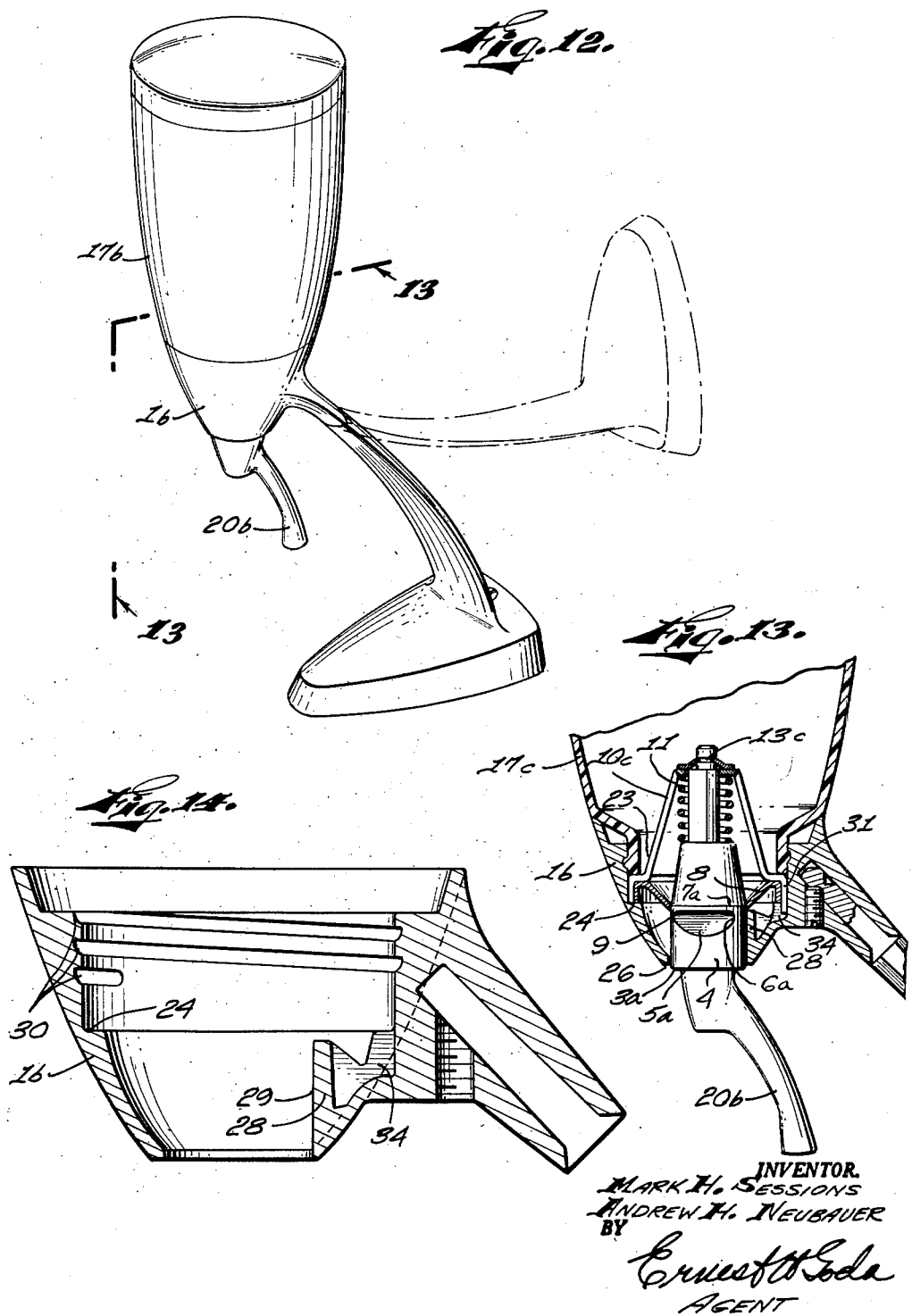

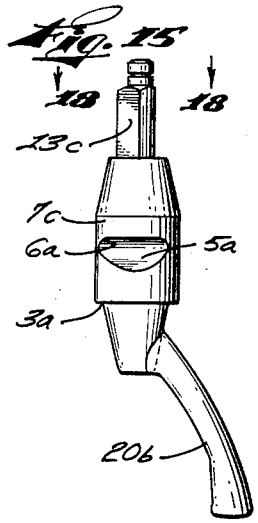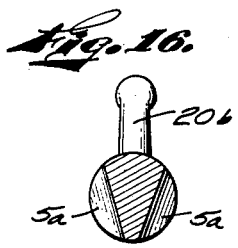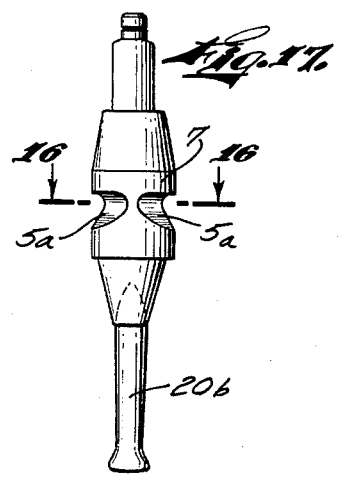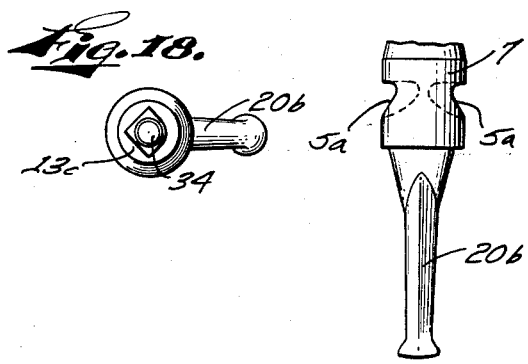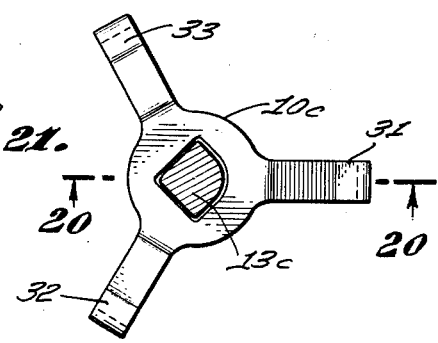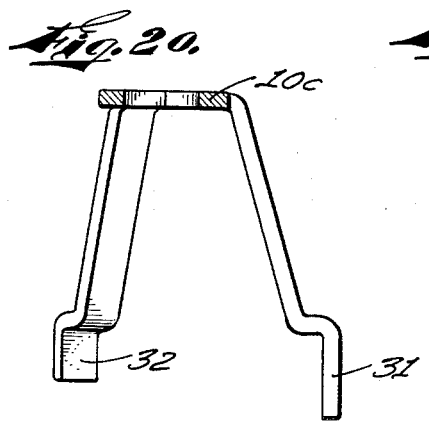

3,072,299
DISPENSER FOR POWDERED SOAP
AND THE LIKE
Marc H. Sessions, 3415 Adina Drive, Los Angeles, Calif., and Andrew H. Neubauer, Rte. 4, Box 20, Vista, Calif.
Filed June 17, 1960, Ser. No. 37,000
7 Claims. (Cl. 222—246)

The present invention is a continuation-in-part of our invention bearing Serial No. 764,573, filed October 1, 1958, now abandoned.

This invention relates as indicated to dispensers for soap and the like and has more particular reference to a new and improved dispensing mechanism for delivering metered amounts of powdered soap and the like.

We are cognizant of the fact that numerous dispensers of various designs have been made in the past for delivering small predetermined amounts of soap.

The dispensers contemplated by this invention are referred to in the art as "valve type" dispensers of which Patent No. 1,993,401 is a typical example. In these prior art devices there exists the tendency for the powdered soap to "cake" in the dispensers and thus render them inoperative, or the dispensers have been so large and unwieldly as to make them undesirable for use in home lavatories, or these prior art dispensers have the tendency to build up layers of moist soap on the depending portion of the plungers.

It is an object of this invention to provide a dispensing mechanism of novel construction which does not become inoperative due to the tendency of powdered soap to "cake."

A further object is to provide a dispensing mechanism for powdered soap and the like which permits the design of a dispenser acceptable for use in homes as well as industrial and commercial uses.

A still further object of this invention is to provide a dispensing mechanism which delivers a metered amount of material with each operation of the valve.

Another object of the present invention is to provide a dispensing mechanism which is operationally independent of the powder container and which can be readily fitted to containers of various sizes and shapes.

Still another object of this invention is to provide a dispensing mechanism from which no material can flow as long as the plunger is in the closed position even though the dispenser is severely jarred.

A further object of this invention is to provide a dispensing mechanism which prevents build-up of soap on the plunger.

Other objects will appear as the description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a perspective view of a dispenser of this invention;

FIG. 2 is a section along line 2—2 of FIG. 1 showing the dispensing mechanism in longitudinal cross section;

FIG. 3 is an exploded view of the working parts of the present invention;

FIG. 4 is an enlarged view showing more detail of the improved type of valve plunger contemplated by this invention;

FIG. 5 is a plan section taken in a plane represented by the line 5—5 of FIG. 7;

FIG. 6 is a modified form of the view of FIG. 5;

FIG. 7 is an exploded view of a modified form of the dispensing mechanism of the present invention;

FIG. 8 is a perspective view of a modification of the present invention;

FIG. 9 is a modification of the present dispensing mechanism partly in section;

FIG. 10 is a top plan view of FIG. 9 showing the plunger in place;

FIG. 11 is a section along line 11—11 of FIG. 8 showing the dispensing mechanism in longitudinal cross section;

FIG. 12 is a side view of a further modification of the present invention;

FIG. 13 is a section along line 13—13 of FIG. 12 showing the dispensing mechanism in longitudinal cross section;

FIG. 14 is the longitudinal cross section of FIG. 13 with the dispensing mechanism removed;

FIG. 15 is a side view of a modified form of the plunger valve of the present invention;

FIG. 16 is a top plan view of FIG. 17 taken through line 16—16;

FIG. 17 is a front view of FIG. 15;

FIG. 18 is a top plan view of FIG. 15 along line 18—18;

FIG. 19 is a rear view of FIG. 15;

FIG. 20 is a longitudinal section along line 20—20 of FIG. 21; and FIG. 21 is a modified form of the view of FIG. 5.

The present dispensing mechanism is made up of housing 1 which contains essential elements plunger valve 3, plate 8, which provides discharge opening 9, and support 10 which acts as a means for supporting plunger valve 3. Housing member 1 has a circumferentially disposed ledge 24, which provides a means for supporting removable plate 8, and the upper portion of housing 1 above ledge 24 is adapted to receive a bushing or a container. As shown in FIGS. 1 and 2, housing 1 has inserted therein bushing 2, which in turn is adapted to receive a container such as container 17. It is of interest to note here that housing member 1 is adapted to receive a separate bushing, such as bushing 2, or a container, the lower end of which is adapted to act as a bushing such as shown in FIGS. 8, 11, 13 and 14. It is immaterial to the present dispensing mechanism whether a separate bushing or a container adapted to act as a bushing is used. By using different bushings the present dispensing mechanism can be adapted for use with a variety of containers; as for example in FIG. 7, the end 21a of bushing 2a is adapted to receive a container 17a of entirely different proportions than containers 17, 17b or 17c. The upper portion of bushing 2 is adapted at end 21 to support container 17 as by adapter 18, which has an outside diameter just sufficiently smaller than the inside diameter of end 21 so as to make a tight fit. Similarly end 27 of bushing 2 is adapted to fit tightly into housing member 1, whereby support means 10 and plate 8 are firmly held in place by pressure of edge 25 of end 27 of bushing 2. In a modification of the present invention, as illustrated in FIGS. 13 and 14, housing 1b is provided with threads 30 adapted to receive a container 17c having a threaded end which when turned into housing 1b firmly holds the dispensing mechanism in place. Thus, the dispensing mechanism can be easily assembled to supporting bracket 15, as shown in FIG. 3, by inserting bushing 2 into housing 1 and container 17 into the top portion of bushing 2, or the dispensing mechanism using housing 1b can be assembled and attached to a stand as shown in FIG. 12. The assembled dispenser can be easily attached to a sink or to a wall, as shown at 16, by adhesive, screws, or other means. As stated above and as will be clearly seen in the annexed drawings, the present dispensing mechanism can be readily designed to accommodate containers of many different sizes and shapes without altering the basic operating principles of the present invention.

Reference numeral 3 indicates the plunger valve which comprises valve body 4, which is secured to or formed integrally with lower stem 20 and upper stem 13, which extends through an aperture in supporting member 10 where it is located in place with a cotter pin or other holdings means 12. Removable plate 8 which is disposed on legs 24 provides upper discharge opening 9 and additionally acts to separate reservoir chamber 23 from discharge chamber 22. Disposed on plate 8 is support means 10 which has a plurality of legs. We prefer support 10 to be in the form of a tripod, as such a structure permits easy flow of material, and at the same time provides equal distribution of pressure on plate 8. Ledge 19 of bushing 2 acts as a stop for adapter 18 of container 17. A spring or other pressure means 11 is disposed on stem 13 between support means 10 and the top surface of valve body 4 holding plunger valve 3 in its normal closed position. Plunger valve 3 is inserted through discharge opening 26 of housing member 1. In its normally closed position the lower portion of valve body 4 occupies the lower discharge opening 26 and is effective to close the same and prevent the flow of material. At the same time that the lower portion of valve body 4 effectively closes lower discharge opening 26, shoulders 7 of notches 5 occupy upper discharge opening 9 preventing the flow of material from reservoir area 23 into discharge area 22. Thus plunger valve 3, which is in the nature of an elongated cylinder, is of the size that it is freely slideable in discharge openings 9 and 26, and at the same time is effective to close such openings and prevent flow of powdered material when in its normal closed position.

For the purpose of delivering metered amounts of material following an upward movement of the plunger, the valve body 4 is provided with a plurality of downwardly divergent notches 5. It is important at this time to particularly observe that notches 5 terminate at their upper ends in radii 6 with shoulders 7. We have found that by forming a radius as indicated at 6, the severe tendency of material tending to collect in the notch is overcome. The plunger 3 is suspended by support 10 so that at the closed position notches 5 fall below discharge opening 9 and shoulders 7 effectively close the opening at the same time the portion of valve body 4 below notches 5 effectively closes discharge opening 26. The length of the notches 5 is slightly less than the distance from the top surface of valve body 4 to bottom surface of the aperture of support 10 so that when plunger 3 is pushed into its uppermost position the discharge opening 9 is effectively closed by the portion of the valve body below the notches 5. Thus as the notches 5 are raised into position to pick up material from reservoir chamber 23, the material in discharge chamber 22 empties into the hands of the user. In releasing the plunger, the notches 5 carry new material into discharge chamber 22, replacing the material which emptied into the hands of the operator. It is to be observed that when discharge chamber 22 is opened and delivers material into the hands of the operator, reservoir chamber 23 is effectively closed thus preventing water from being splashed into the main storage area, and at the same time preventing valve body 4 getting wet since it is in chamber 23. If desired, a wire 14 or other probing means can be attached to the top portion of stem 13 so that when the plunger is pushed upward the wire 14 acts to break up any material which tended to agglomerate.

The form of the invention shown principally in FIGS. 7 and 13 is the same in its general construction and operation to that just described in connection with FIGS. 1, 2, 3 and 4 and slight variations are indicated by the same reference numerals distinguished by the letters "a," "b" and "c." Attention is directed to lower stems 20a and 20b, which are designed in the nature of a "dog leg." Such a stem is designed with the idea of keeping the handle out of range of the discharging powdered soap or the like. In using a stem, such as 20a or 20b, it becomes necessary to maintain the dog leg portion towards the back of the dispensing mechanism so that it can effectively stay out of range of the discharging material. Thus it becomes necessary to change the upper stem from a cylindrical shape so that it can be kept from rotating. FIGS. 5, 6 and 19 are illustrative of variations in the apertures of support 10 which would effectively prevent stem 20a or 20b from rotating. The apertures of supports 10a, 10b and 10c differ from support 10 in that the apertures are rectangular, triangular and a square having one rounded edge, respectively, and stems 13a, 13b and 13c are correspondingly shaped to conform with the apertures. Using these latter apertures or other flat-sided geometrical shapes provides means whereby when the corresponding stem is inserted therein it will be kept from rotating. In this respect special attention is directed towards support 10c and stem 13c of plunger valve 3a. "Dog legs" 20b is indexed in relation to support 10c by means of stem 13c which is a square having one rounded edge and terminates in conical portion 35. The aperture of support 10c is the same shape as stem 13c and during assembly conical portion 35 rotates freely in the aperture of support 10c until the angular relation between support 10c and stem 13c is correct and the rounded square portion coincides with the mating aperture of support 10c. The entire mechanism when placed into housing 1b is then automatically indexed, as will be explained later, so that the "dog leg" 20b, as shown in FIG. 13, is to the rear of the dispenser.

FIGS. 8, 9, 10, 11, 14, 15, 16, 17, 18, 19 and 20 are still further modifications of the present invention. Referring more specifically to FIGS. 9 and 14, it will be seen that housing members 1a and 1b have a plunger guide block 28, which is especially useful in conjunction with stems 20a and 20b. It will be noted, however, that guide block 28 can also be used with circular stem 20 if desired. Guide block 28 serves as a guide for the vertical motion of plunger valves 3 and 3a, and the face 29 of guide block 28 provides a smooth supporting surface which prevents valve body 4 or 4a from excessive rubbing against the edges of removable plate 8, and thus enlarging discharge opening 9. It becomes obvious that it is desirable to prevent the enlargement of discharge opening 9 so as to prevent excess flow of material. Still further guide block 28 causes the powdered material to distribute itself in the forward part of housing member 1a, and thus when the powdered material or the like discharges through discharge opening 26 the material tends not to fall on the "dog leg" portion of the plunger valve. The width of face 29 of guide block 28 is substantially equal to or slightly less than the distance between notches 5 so as not to overlap such notches and prevent pick up of material as notches 5 move upwardly into reservoir chamber 23. As previously described, valve body 4 is provided with a plurality of downwardly divergent notches 5. Referring now to FIGS. 15, 17 and 18, valve body 4a has a pair of notches 5a which not only are downwardly divergent, but also are forwardly convergent, leaving a continuous wide-bearing surface on the back of valve body 4a. This gives a good sliding surface against face 29 of guide block 28, but even of more importance the forwardly convergent notches 5a cause the powdered soap or like material to be discharge forwardly away from the depending hand-engaged portion of the lower stem 20b. This prevents build up of moist material on the downwardly extending portion stem 20b, and thus overcomes one of the most objectionable features of prior art dispensers.

Assembly of the present dispensing mechanism is extremely simple and requires no nuts and bolts, screws, or welding. The present dispensing means can be made out of plastic, aluminum, zinc alloy, etc., and can be used to dispense a variety of powdered materials from a multitude of different kinds of containers.

In assembling the mechanism illustrated in FIGS. 1, 2 and 3, plate 8 is dropped into place on ledge 24, supporting means 10 is then disposed on top of plate 8. Spring 11 is placed over stem 13 and the stem is then inserted through opening 9 and through the aperture at the top of support 10 and held in place as by cotter pin 12. The dispensing mechanism is then held together by insertion of either bushing 2 or by insertion of a container adapted to be inserted directly into housing member 1.

Attention is now directed to the modifications illustrated in FIGS. 13, 14, 19 and 20. Support 10c is so constructed that downwardly depending tabs 31, 32 and 33 firmly clasp plate 8. While the length of tabs 31, 32 and 33 are not critical since they are primarily for grasping plate 8, it is preferred that one tab, as for example tab 31 in FIG. 20, is slightly longer than the remaining tabs. Having one tab longer than the rest provides an indexing means whereby the mechanism must always be assembled in the same manner and thus eliminates the possibility of error in assembling the unit. In putting together the unit illustrated in FIG. 13, plate 8 is snapped into support 10c and firmly held in place by tabs 31, 32 and 33. Spring 11 is placed over stem 13c and the stem is then inserted through opening 9 of plate 8 and rotated until it is properly indexed in the aperture of support 10c and held in place as by cotter pin 12 or a press washer or other holding means. The entire mechanism which is now a one-piece unit is dropped into housing member 1b and rotated until tab 31 is properly indexed with and falls into opening 34. It now becomes apparent by use of the foregoing modifications the dispenser is always put together in such a manner whereby the downwardly depending "dog leg" extends to the rear of the dispenser, away from the falling powder. Container 17c when threaded into place presses against the assembled dispensing mechanism holding it firmly in place. If it is desired to disassemble the dispenser, container 17c is removed and the entire dispensing mechanism is lifted out as a complete unit, including plate 8.

The operation of the present dispenser is the same regardless of its modifications and is as follows: Since spring 11 is exerting downward pressure against valve body 4 the plunger 3 is in its normal closed position as shown in FIGS. 2, 11, and 13. Prior to assuming this position plunger 3 was moved into its uppermost position by the hand of the operator and when moved into this position, notches 5 or 5a were placed above discharge opening 9 into reservoir chamber 23, the body portion 4 below notches 5 or 5a moved into discharge opening 9 effectively sealing the same. As notches 5 or 5a entered into reservoir chamber 23, the notches filled with material and the powder already in discharge chamber 22 dropped into the operator's hands. Upon release of the stem 20, 20a, or 20b by the hand, spring 11 pushes plunger 3 or 3a downwardly whereby shoulders 7 effectively seal discharge opening 9. Notches 5 or 5a empty into chamber 22 and the body portion below notches 5 or 5a effectively close discharge opening 26. Thus it is to be noted that material is delivered only on the upward stroke of the plunger. The operation of the modified dispensers shown in FIGS. 7 through 20 is the same except, as previously noted, in the instance where guide block 28 and forwardly convergent notches 5a are present the material is distributed forward of the "dog leg" of stem 20a or 20b.

From the foregoing description it is apparent that the dispensing mechanism of this invention is of simple construction and is easily assembled and disassembled for cleaning purposes. For the first time there has been provided a dispensing mechanism which is operationally independent of the container for the powdered material, and which dispensing mechanism is readily adaptable to a variety of sizes and shapes of containers for powdered material.

Other modes of applying the principle of the invention may be employed, change being made as regards the details described, provided the features stated in any of the following claims or the equivalent of such be employed.

We, therefore, particularly point out and distinctly claim as our invention:

1. In a device for dispensing powdered material a housing comprising upper and lower material chambers, said lower chamber having a discharge opening, and an internal ledge circumferentially disposed on said housing above said discharge opening, a removable plate having an opening therein and disposed on said ledge; a plunger valve mounted for vertical movement in said discharge opening and the opening in said removable plate; means disposed above the opening in said removable plate for slideably supporting said plunger valve; said plunger valve provided with upper and lower stem portions and a valve body disposed between said stem portions and being larger in cross section than said stems, said valve body having a plurality of downwardly divergent notches, said notches so placed that when the plunger valve is in its lower position they are below the opening in said removable plate and the shoulders of said notches effectively close the opening in said removable plate, and the body portion below said notches is effectively closing said discharge opening and when said plunger valve is in its upper position said notches are above the opening in said removable plate and the body portion below said notches is effectively closing the opening in said removable plate; pressure means disposed between the support means and the upper surface of said valve body effective to maintain the plunger valve in its lowermost position; and bushing means adapted to fit into the upper section of said housing and effectively hold said support means and said removable plate in place.

2. A dispensing mechanism for use in powdered soap dispensers comprising in combination a plate having an opening, a plunger valve adapted for vertical movement in said opening, tripod means for slideably supporting said plunger valve having an opening in the top thereof and disposed above and abutting said plate and the legs thereof adapted to firmly grasp said plate, a plunger valve disposed through the opening of said plate and extending through the opening of said tripod means provided with upper and lower stem portions and a valve body disposed between said stem portions and having a larger cross section than said stems, spring means disposed between said tripod and the upper end of said valve body, said lower stem portion extending downwardly and rearwardly from the longitudinal axis of said valve body, said valve body having a pair of downwardly divergent and forwardly convergent notches whereby the area between the back of said notches is greater than the area between the front of said notches.

3. In a device for dispensing powdered material a housing comprising upper and lower material chambers, said upper chamber adapted to support a container of powdered material, said lower chamber having a discharge opening and a removable plate having an opening and disposed between said upper and lower chambers; a plunger valve mounted for vertical movement in said discharge opening and the opening in said removable plate; tripod means for slideably supporting said plunger valve and having an opening in the top thereof, said tripod means disposed above and abutting said removable plate and the legs thereof adapted to firmly grasp said removable plate; said plunger valve provided with upper and lower stem portions and a valve body disposed between said stem portions having a substantially larger cross section than said stems, said lower stem portion extending downwardly and rearwardly from the longitudinal axis of said valve body; said valve body having a pair of downwardly divergent and forwardly convergent notches terminating in radii at their upper ends with the shoulders of said notches, whereby the area between the back of said notches is greater than the area between the front of said notches, and said notches so placed that when the plunger valve is in its lower position they are below the opening in said removable plate and the shoulders of said notches effectively close the opening in said removable plate and the body portion below said notches is effectively closing the discharge opening, and when said plunger valve is in its upper position said notches are above the opening in said removable plate and the body portion below said notches is effectively closing the opening in said removable plate; spring means disposed between said tripod and the upper surface of said valve body effective to maintain the plunger valve in its lowermost position; and said housing adapted to receive a container whereby said support means and said removable plate are firmly held in place.

4. The dispensing device of claim 3 wherein said housing contains a guide block for said valve body, the width of the face of said guide block being substantially equal to the area between the notches at the rear of said valve body.

5. A device for dispensing powdered materials comprising in combination a housing having an upper portion adapted to receive bushing means and a lower portion having a discharge opening, the internal diameter of said upper portion being larger than the internal diameter of said lower portion whereby a circumferentially disposed ledge is formed between said upper and lower portions, a removable plate having an opening therein disposed on said ledge, a plunger valve mounted for vertical movement in said discharge opening and the opening in said plate, means for slideably supporting said plunger valve in a substantially vertical position said support means disposed on said plate and extending upwardly above the opening in said plate, said plunger valve provided with a valve body portion having a plurality of downwardly divergent notches, said notches so placed that when the plunger valve is in its lower position they are below the opening of the removable plate and the body portion of said valve below the notches is effectively closing said discharge opening, and when said plunger valve is in its upper position said notches are above said discharge opening and the body portion below said notches is effectively closing the opening in said removable plate, bushing means adapted to fit into the upper portion of said housing and effectively hold said support means and said removable plate in place on said ledge.

6. The device of claim 5 wherein said plunger valve is provided with upper and lower stem portions and a valve body disposed between said stem portions, and being larger in cross section than said stem portions, and spring means disposed between said support means and the upper surface of said valve body effective to maintain the plunger valve in its lowermost position.

7. The dispensing device of claim 6 wherein said housing contains a guide block for said valve body, the width of the face of said guide block being substantially equal to the distance between the notches of said valve body.

References Cited in the file of this patent

UNITED STATES PATENTS

| | | |
|---|---|---|
| 1,062,576 | Baskett et al. | May 20, 1913 |
| 1,208,784 | Holmes | Dec. 19, 1916 |
| 1,993,401 | Dudley | Mar. 5, 1935 |
| 2,311,330 | Dudley | Feb. 16, 1943 |
| 2,601,139 | Hill | June 17, 1952 |
| 2,751,128 | Prince | June 19, 1956 |
| 2,939,613 | Herman et al. | June 7, 1960 |